United States Patent [19]

Matsuoka

[11] Patent Number: 5,857,914
[45] Date of Patent: Jan. 12, 1999

[54] CONFIGURATION FOR CONNECTING OUTER RADIAL PORTIONS OF DISK PORTIONS OF A DAMPER DISK ASSEMBLY

[75] Inventor: Yoshihiro Matsuoka, Neyagawa, Japan

[73] Assignee: Exedy Corporation, Neyagawa, Japan

[21] Appl. No.: 903,789

[22] Filed: Jul. 31, 1997

[30] Foreign Application Priority Data

Aug. 2, 1996 [JP] Japan .................................... 8-204881

[51] Int. Cl.[6] .................................................... F16D 3/66
[52] U.S. Cl. ................................ 464/64; 192/212; 464/68
[58] Field of Search .............................. 464/64, 66, 67, 464/68; 192/212, 213, 213.31, 213.22; 74/574

[56] References Cited

U.S. PATENT DOCUMENTS

| | | |
|---|---|---|
| 3,938,635 | 2/1976 | Davies et al. ........................ 192/213.31 |
| 4,222,476 | 9/1980 | LeBrise ............................... 192/213.31 |
| 4,570,775 | 2/1986 | Caray et al. .............................. 464/64 |
| 4,580,672 | 4/1986 | Caray ......................................... 464/68 |
| 4,669,594 | 6/1987 | Weissenberger et al. ................ 464/68 |
| 4,688,666 | 8/1987 | Blond ........................................ 464/68 |
| 5,697,846 | 12/1997 | Uenohara .................................. 464/64 |

*Primary Examiner*—Eileen Dunn Lillis
*Attorney, Agent, or Firm*—Shinjyu An Intellectual Property Firm

[57] ABSTRACT

A damper disk assembly includes a clutch plate 4, a retaining plate 5 arranged coaxially and parallel to the clutch plate 4, a separate flange 3 arranged coaxially between the plates 4 and 5, a plurality of plate coupling portions 30 extending integrally from an outer peripheral portion of the clutch plate 4 to an outer peripheral portion of the retaining plate 5 and being arranged at the clutch plate 4 with a circumferentially equal space between each other, a ring member 35 arranged coaxially to the retaining plate 5 for cooperating with the plate coupling portions 30 to fix the plates 4 and 5 together, and coil springs for circumferentially elastically coupling the plates 4 and 5 to the separate flange 3.

10 Claims, 4 Drawing Sheets

CONFIGURATION FOR CONNECTING OUTER RADIAL PORTIONS OF DISK PORTIONS OF A DAMPER DISK ASSEMBLY

BACKGROUND OF THE INVENTION

A. Field of the Invention

The present invention relates to a damper disk assembly, and in particular to a damper disk assembly having a pair of first disk members fixed together, a second disk member disposed between the pair of first disk members, and an elastic member for coupling the first disk members to the disk member allowing limited rotary displacement between the first and second disk members.

B. Description of the Background Art

A damper disk assembly used in a clutch disk for a motorized vehicle typically includes a pair of input plates opposed to each other, an output hub formed integrally with a radially extending flange, the flange extending between the pair of input plates, and torsion springs for circumferentially coupling the pair of input plates to the flange. The paired input plates are fixed together at their outer peripheral portions by a plurality of stop pins. The stop pins extend between the paired input plates and further extend through recesses formed on the outer periphery of the flange. The paired input plates and the flange are relatively rotatable with respect to each other through a predetermined angle, and are prevented from further relative rotation when the stop pins come into contact with edges of the recesses.

In the conventional clutch disk assembly, the stop pins are used also for fixing the paired input plates together. The stop pins complicate the manufacturing process with regard to fixing the paired input plates to one another.

SUMMARY OF THE INVENTION

An object of the invention is to simplify the manufacturing process of a damper disk assembly by eliminating stop pins from the assembly.

In accordance with one aspect of the present invention, a damper disk assembly includes a first disk member and a second disk member arranged coaxially and parallel to the first disk member. A third disk member is arranged coaxially between the first and second disk members, A plurality of plate coupling portions extend integrally from an outer peripheral portion of the first disk member to an outer peripheral portion of the second disk member and are formed on the first disk member at circumferentially equally spaced apart intervals. The plate coupling portions include extensions formed on the first disk member. The extensions are bent to define base portions extending integrally in an axial direction from the outer peripheral portion of the first disk member. Each of the base portions are formed integrally with a first restricting portion extending radially inward from the base portion for restricting axially movement of the second disk member away from the first disk member. A snap ring is disposed coaxially with the second disk member between, the second disk member and the second restricting portion of the plate coupling portions. An elastic member circumferentially elastically couples the first and second disk members to the third disk member. Each of the base portions is further formed integrally with a second restricting portion extending radially inward from the base portion for restricting axial movement of the second disk member toward the first disk member.

The plate coupling portions serve several purposes. First, the plate coupling portions rigidly fix the first and second disk members together. Second, the plate coupling portions are fixed to the first and second disk members such that the first and second disk members are held in a fixed spaced apart relationship with respect to one another. Third, the plate coupling portions extend through recesses formed in an outer periphery of the third disk member such that upon relative rotation between the first and third disk members, the plate coupling portions engages ends of the recesses formed in the third disk member. The plate coupling portions have a circumferential length that is shorter than the circumferential recesses formed in the third disk member. Therefore, the plate coupling portions serve as stoppers limiting relative rotary displacement between the first and third disk members.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
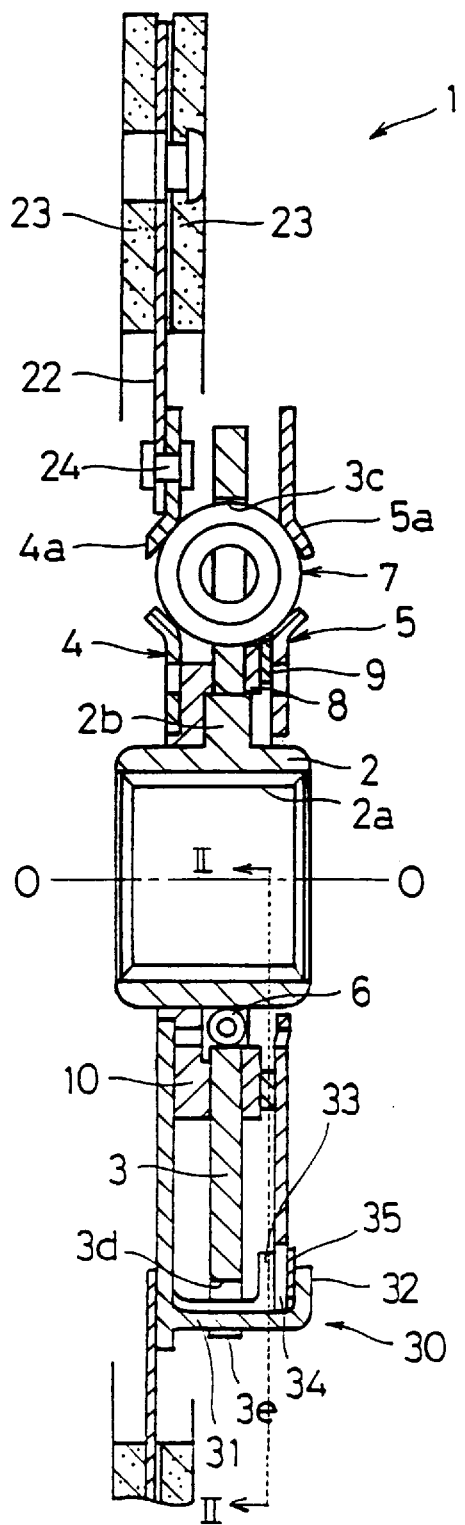
FIG. 1 is a fragmentary, cross section of a clutch disk assembly in accordance with one embodiment of the present invention.
Figure 2:
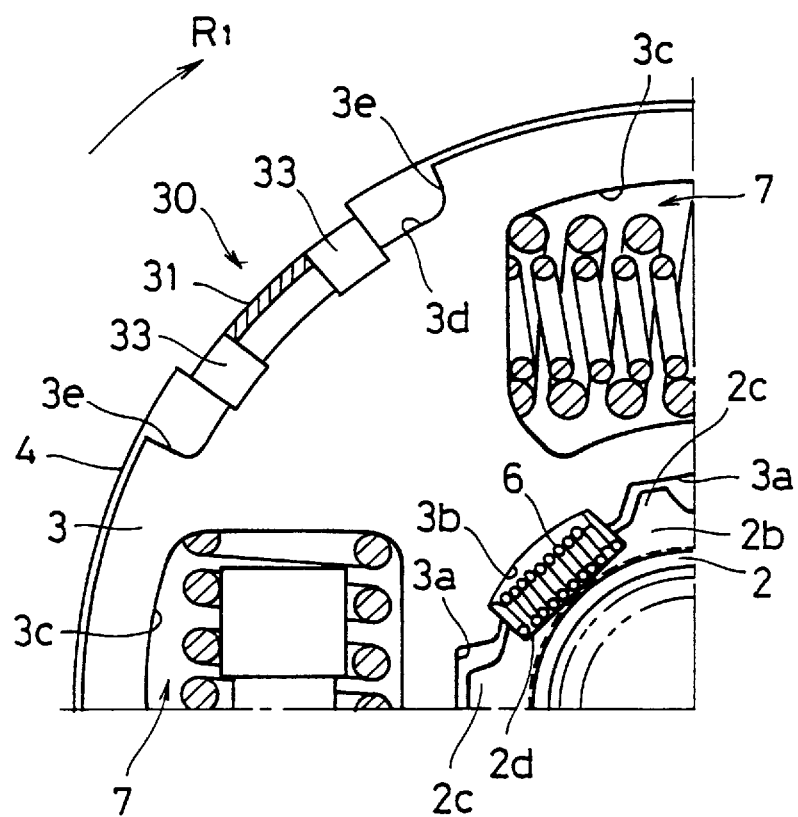
FIG. 2 is a fragmentary cross section of a portion of the clutch disk assembly depicted in FIG. 1, taken along the line II—II in FIG. 1, looking in the direction of the arrows, showing portions of a plate coupling portion.

A clutch disk assembly 1 in accordance with one embodiment of the present invention is shown in FIG. 1. The clutch disk assembly 1 is an apparatus for selectively transmitting and interrupting a torque from an engine (not shown) disposed at the left side of FIG. 1 to a transmission (not shown) disposed at a right side of FIG. 1. Hereinafter, the left side of FIG. 1 will be referred to as the engine side and the right side of FIG. 1 will be referred to as the transmission side. In FIG. 1, a line O—O represents a rotation axis of the clutch disk assembly 1. In FIG. 2, R1 represents a rotation direction of the clutch disk assembly 1.

The clutch disk assembly 1 is provided at its center with a hub 2 coupled to a shaft (not shown) of the transmission. The hub 2 has a spline aperture 2a at its center. The hub 2 is provided at its outer periphery with a small radial flange portion 2b, which is provided at its outer periphery with a plurality of projections 2c (FIG. 2) with a circumferentially equal space between each other. The flange portion 2b is provided at diametrically opposed two portions with recessed seats 2d for receiving opposite ends of small coil springs 6.

A separate flange 3, which is formed as a annular disk-like plate, is disposed radially outside the projections 2c of the hub 2. The separate flange 3 is formed at inner peripheral portions with recesses 3a, which correspond to the projections 2c of the hub 2, respectively. Predetermined spaces are maintained in the circumferential direction between edges of the recess 3a and the projection 2c, so that the separate flange 3 can rotate relatively to the hub 2 through a predetermined angle.

The separate flange 3 is also provided at its inner periphery with two recessed seats 3b radially corresponding to the seats 2d of the hub 2. The small coil springs 6 are arranged in these seats 2d and 3b.

The separate flange 3 is provided at its radially middle portion with circumferentially long four windows 3c. The separate flange 3 is also provided at its outer periphery with radially inward recesses 3d located circumferentially between the windows 3c. Circumferentially opposed surfaces of each recess 3d form contact portions 3e.

As shown in FIG. 1, input rotary members, i.e., a clutch plate 4 and a retaining plate 5 are arranged at axially opposite sides of the separate flange 3. Both the plates 4 and 5 are formed of a pair of circular disk-like members which are parallel to each other, and are rotatably fitted around the outer peripheral surface of the hub 2.

Plate coupling portions 30 are formed at the outer periphery of the clutch plate 4. The plate coupling portions 30 integrally extend from the outer periphery of the clutch plate 4, and are formed at circumferentially equally spaced three portions of the outer periphery of the clutch plate 4. Each plate coupling portion 30 is formed of a projection which extends integrally from the outer periphery of the clutch plate 4 and has a bent portion.

Figure 4:
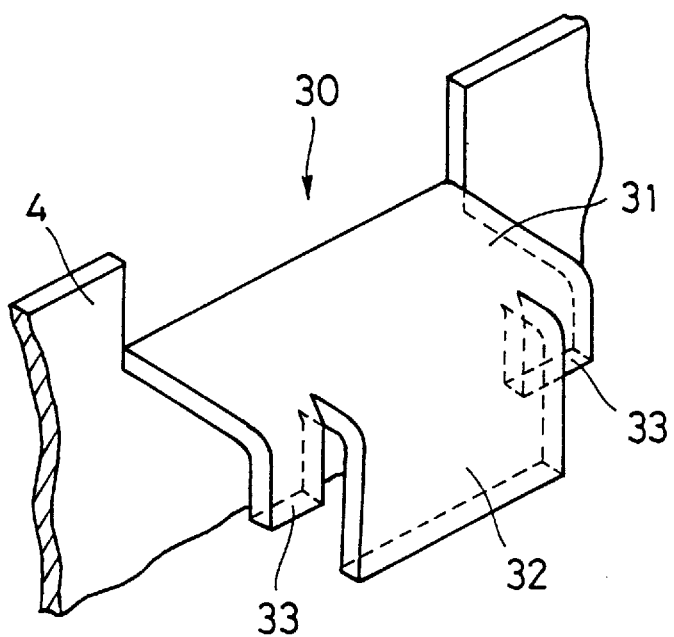
FIG. 4 is a fragmentary perspective view showing a plate coupling portion with portions of the clutch disk assembly removed for clarity.

More specifically, each plate coupling portion 30 has, as shown in FIG. 4, a base portion 31 extending from the clutch plate 4 toward the retaining plate 5, a first restricting portion 32 which extends from the base portion 31 for restricting an axial movement of the retaining plate 5 away from the clutch plate 4, and second restricting portions 33 for restricting an axial movement of the retaining plate 5 toward the clutch plate 4. The base portion 31 extends in an axial direction parallel to the rotation axis O—O. The first and second restricting portions 32 and 33 extend radially inward from the end of the base portion 31.

The separate flange 3 is provided with recesses 3d which are located at positions corresponding to the plate coupling portions 30. The base portion 31 extends through the recess 3d. When the clutch disk assembly 1 undergoes torsional displacement such that the separate flange 3 rotates relative to the plates 4 and 5, the base portion 31 subsequently contacts the contact portion 3e of the recess 3d, so that a relative rotation of the separate flange 3 with respect to the clutch plate 4 is allowed only through a predetermined angle.

Figure 3:
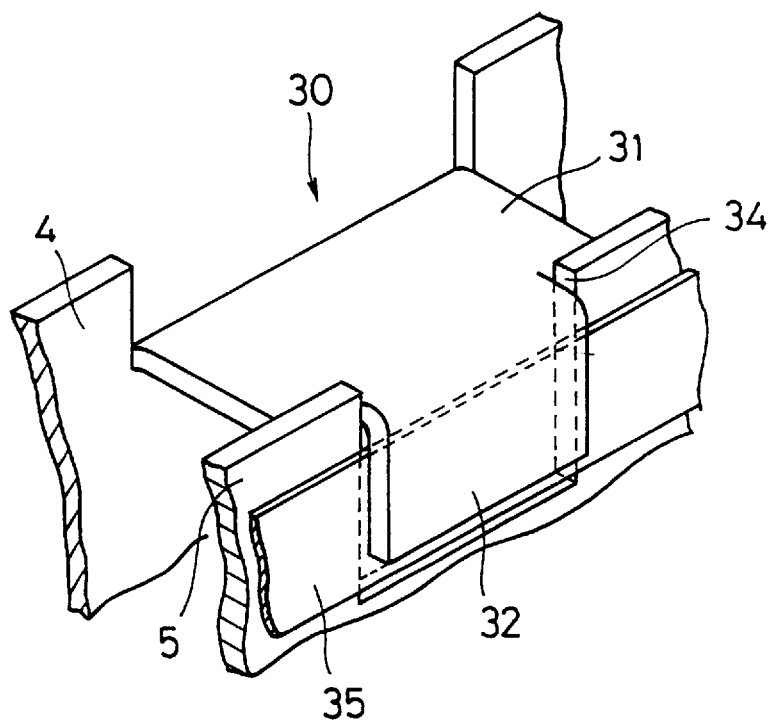
FIG. 3 is a fragmentary perspective view showing further details of the plate coupling portion.

The retaining plate 5, as shown in FIG. 3, is provided at positions corresponding to the first restricting portions 32 with recesses 34 through which the first restricting portions 32 extend, respectively.

A ring member 35 is disposed between the first restricting portions 32 and the retaining plate 5. The ring member 35 is, for example, a snap ring. Alternatively, the ring member 35 may be made of another similar material such as wire. The ring member 35 is arranged coaxially with the plate 5. Due to the ring member 35 interposed between the first restricting portions 32 and the retaining plate 5, the outer peripheral portion of the clutch plate 4 is rigidly fixed to the outer peripheral portion of the retaining plate 5.

A cushioning plate 22 made of a single member is fixed to the outer peripheral portion of the clutch plate 4 by rivets 24. Friction facings 23 are fixed to the opposite sides of the cushioning plate 22. A flywheel (not shown) of the engine is arranged at the left side in FIG. 1 of the friction facing 23. When the friction facing 23 is pressed against the flywheel (not shown), the clutch disk assembly 1 is supplied with a torque of the engine.

As is shown in FIG. 1, the retaining plate 4 and the clutch plate 5 are provided at positions corresponding to the windows 3c at the separate flange 3 with bent portions 4a and 5a which are partially cut and are bent axially outward. Large coil springs 7 are arranged in windows defined by these bent portions 4a and 5a and the windows 3c at the separate flange 3. Each large coil spring 7 has wire and coil diameters larger than those of the small coil spring 6, and therefore has a higher rigidity than the spring 6.

A friction washer 8 and a conical spring 9 are arranged between the inner peripheral portions of the retaining plate 5 and separate flange 3. The friction washer 8 is engaged with the retaining plate 5 for integral rotation, and is in contact with a side surface of the inner peripheral portion of the separate flange 3. The conical spring 9 is arranged between the friction washer 8 and the inner peripheral portion of the retaining plate 5. The inner periphery of the conical spring 9 forces the friction washer 8 toward the separate flange 3, and the outer periphery of the conical spring 9 forces the retaining plate 5 toward the transmission.

A second friction washer 10 is unrotatably engaged with the inner peripheral portion of the clutch plate 4. The second friction washer 10 is in contact with the outer peripheral surface of the hub 2, a side surface of the inner peripheral portion of the separate flange 3, the flange portions 2b of the hub 2 and the projections 2c of the hub 2.

An operation of the clutch disk assembly 1 will be described below.

When the friction facing 23 is pressed against the flywheel (not shown) of the engine, a torque of the engine is supplied to the clutch and retaining plates 4 and 5. This torque is transmitted to the hub 2 through the large coil springs 7, separate flange 3 and small coil springs 6, and then is supplied to the shaft extending to the transmission (not shown).

When a vibration of a small angular amplitude is transmitted to the clutch disk assembly 1 from the engine, the plates 4 and 5 and the separate flange 3 rotate relatively to the hub 2. In this operation, the small coil springs 6 are circumferentially compressed. In this operation, the vibration of a small angular amplitude is damped owing to the characteristics of a low rigidity in the small coil springs 6.

When a vibration of a large angular amplitude is transmitted to the clutch disk assembly 1, the separate flange 3 and the hub 2 rotate together and rotate relative to the plates 4 and 5. In this operation, the large coil springs 7 are circumferentially compressed, and the first friction washer 8 slides on the separate flange 3 to generate a large friction. Owing to the characteristics of these high rigidity and large friction, the vibration of a large angular amplitude is effectively damped.

When the plates 4 and 5 rotate relative to the separate flange 3 through a large angle, the base portions 31 of the plate coupling portions 30 are brought into contact with the contact portions 3e of the separate flange 3. Thereby, the plates 4 and 5 will no longer rotate relatively to the separate flange 3.

The above described embodiment does not employ conventional stop pins, but employs the plate coupling portions 30 for achieving a structure which couples the plates 4 and 5 together and restricts the relative rotation of the plates 4 and 5 to the separate flange 3.

Then, a manner of assembling this clutch disk assembly 1 will be described below.

First, the cushioning plate 22 is fixed to the clutch plate 4 by the rivets 24. Then, the hub 2, separate flange 3, large coil springs 7, small coil springs 6, second friction washer 10, first friction washer 8, conical spring 9 and others are assembled on the clutch plate 4.

The retaining plate 5 is arranged on the clutch plate 4. In this operation, the retaining plate 5 is positioned such that the recesses 34 correspond to the first restricting portions 32 of the plate coupling portions 30, respectively (FIG. 3), and the first restricting portions 32 extend through the recesses 34, as shown in FIG. 3. Next, the ring member 35 is inserted between the retaining plate 5 and the first restricting portions 32, and thereby the assembly is completed.

For disassembly, the ring member 35 is removed from the space between the retaining plate 5 and the first restricting portions 32, so that the clutch disk assembly 1 can be disassembled easily.

It should be appreciated that the ring member 35 may not be a continuous annular member but may be an annular member that is cut such that it may easily be installed in the assembly, as described above.

MODIFICATION

The plate coupling portions 30 may be integrally formed at the outer periphery of the retaining plate 5. In this case, the ring member 35 may be inserted from the clutch plate 4 side.

The damper disk assembly according to the invention does not employ conventional stop pins but employs the plate coupling portions and the ring member for fixing the first and second disk members together. Thereby, the manufacturing process is simplified.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. The damper disk assembly, comprising:

a first disk member;

a second disk member arranged coaxially and parallel to said first disk member;

a third disk member arranged coaxially between said first and second disk members;

a plurality of plate coupling portions extending integrally from an outer peripheral portion of said first disk member to an outer peripheral portion of said second disk member and being formed on said first disk member at circumferentially equally spaced apart intervals, said plate coupling portions including extensions formed on said first disk member, said extension being bent to define base portions extending integrally in an axial direction from the outer peripheral portion of said first disk member, each of said base portions being formed integrally with a first restricting portion extending radially inward from said base portion for restricting axially movement of said second disk member away from said first disk member;

a ring member disposed coaxially with said second disk member between said second disk member and said first restricting portion;

an elastic member for circumferentially elastically coupling said first and second disk members to said third member; and wherein each of said base portions is further formed integrally with a second restricting portion extending radially inward from said base portion for restricting axial movement of said second disk member toward said first disk member.

2. The damper disk assembly according to claim 1, wherein said second restricting portion extends axially inward between said first restricting portion and said first disk member.

3. The damper disk assembly according to claim 2, wherein said third disk member is formed with a plurality of recesses at positions corresponding to said plate coupling portions, and said base portions extend through said recesses and cooperate with said recesses to restrict relative rotation between said third disk member and said first and second disk members.

4. The damper disk assembly according to claim 3, wherein said second disk member is formed with recesses corresponding to said first restricting portions, said first restricting portions extending therethrough, and said ring member is disposed between said second disk member and said first restricting members.

5. The damper disk assembly according to claim 4, wherein said ring member is a snap ring inserted between said second disk member and said plate coupling portions.

6. A damper disk assembly comprising:

a first disk member;

a second disk member arranged coaxially and parallel to said first disk member, said second disk member being formed at an outer peripheral portion with a plurality of circumferentially space apart recesses;

a third disk member arranged coaxially between said first and second disk members;

a plurality of place coupling portions extending integrally from an outer peripheral portion of said first disk member in an axial direction toward said outer peripheral portion of said second disk member, said plate coupling portions being formed on said first disk member at circumferentially equally spaced apart intervals, said plate coupling portions engaging corresponding ones of said recesses on said outer peripheral portion of said second disk member for restricting all relative rotary displacement between said first and second disk members;

a ring member disposed coaxially with said second disk member on a first axial side of said second disk member proximate said outer peripheral portion, said ring member being confined between said second disk member and a first portion of said plate coupling portions for retaining said plate coupling portions in engagement with said second disk member; and an elastic member for circumferentially elastically coupling said first and second disk members to said third disk member.

7. The damper disk assembly according to claim 6, wherein each of said plate coupling portions comprises:

a base portion which extends in an axial direction from an outer peripheral portion of said first disk member toward said second disk member;

a second portion extending radially inward from said base portion for engagement with a second axial side of said second disk member for restricting axial movement of said second disk member toward said first disk member; and said first portion extends radially inward from a distal end of said base portion, wherein portions of said second disk member extend radially outward between said first restricting portion and said second restricting portion, and said ring member is a snap ring disposed between said first axial side of said first disk portion and said second restricting portion.

8. The damper disk assembly according to claim 7, wherein said third disk member is formed with a plurality of recesses at positions corresponding to said plate coupling portions, and said base portion extend through said recesses and cooperate with said recesses to restrict relative rotation between said third disk member and said first and second disk members.

9. A damper disk assembly comprising:

a first disk member;

a second disk member arranged coaxially and parallel to said first disk member;

a third disk member arranged coaxially between said first and second disk members, said third disk member being formed with a plurality of recesses on a radial outer periphery, said recesses on said third disk member being circumferentially spaced apart from one another;

a plurality of plate coupling portions extending integrally from an outer peripheral portion of said first disk member in an axial direction toward said outer peripheral portion of said second disk member, said plate coupling portions being formed on said first disk member a: circumferentially equally spaced apart intervals, said plate coupling portions engaging said outer peripheral portion of said second disk member for restricting relative rotary displacement between said first and second disk members, said plate coupling portions extending through said recesses in said third disk member, said recesses having a circumferential length greater than a circumferential length of said plate coupling portions such that said plate coupling portions contact end surfaces of said recesses in response to relative rotary displacement between said first disk member and said third disk member limiting relative rotary displacement therebetween to a predetermined angular displacement range;

a ring member disposed coaxially with said second disk member on a first axial side of said second disk member proximate said outer peripheral portion, said ring member being confined between said second disk member and a first portion of said plate coupling portions for retaining said plate coupling portions in engagement with said second disk member; and an elastic member for circumferentially elastically coupling said first and second disk members to said third disk member.

10. The damper disk assembly according to claim 9, wherein each of said plate coupling portions comprises:

a base portion which extends in an axial direction from an outer peripheral portion of said first disk member toward said second disk member;

a second portion extending radially inward from said base portion for engagement with a second axial side of said second disk member for restricting axial movement of said second disk member toward said first disk member;

said first portion extends radially inward from a distal end of said base portion, wherein portions of said second disk member extend radially outward between said first restricting portion and said second restricting portion, and said ring member is disposed between said first axial side of said second disk portion and said first restricting portion.

* * * * *